US008585864B2

(12) United States Patent
Zhang et al.

(10) Patent No.: US 8,585,864 B2
(45) Date of Patent: Nov. 19, 2013

(54) FIRE AND SMOKE RETARDANT COMPOSITE MATERIALS

(75) Inventors: Chuck Zhang, Tallahassee, FL (US); Zhiyong Liang, Tallahassee, FL (US); Ben Wang, Tallahassee, FL (US); Qiang Wu, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 13/089,013

(22) Filed: Apr. 18, 2011

(65) Prior Publication Data

US 2011/0253330 A1 Oct. 20, 2011

Related U.S. Application Data

(60) Provisional application No. 61/325,009, filed on Apr. 16, 2010.

(51) Int. Cl.
*D21H 21/34* (2006.01)
*D21H 27/38* (2006.01)
*B82B 3/00* (2006.01)
*B32B 29/02* (2006.01)

(52) U.S. Cl.
USPC ........... 162/159; 162/125; 162/132; 162/152; 162/181.3; 428/367; 428/408; 428/537.5; 977/700; 977/742; 977/842

(58) Field of Classification Search
USPC .............. 162/123–132, 141, 145, 146, 157.1, 162/158, 152, 159, 181.1–181.3; 428/357, 428/364, 367, 408, 411.1, 537.5; 977/700, 977/712, 742, 842, 902
See application file for complete search history.

(56) References Cited

U.S. PATENT DOCUMENTS

| 6,036,857 | A | 3/2000 | Chen et al. | |
|---|---|---|---|---|
| 7,105,596 | B2 | 9/2006 | Smalley et al. | |
| 7,459,121 | B2 * | 12/2008 | Liang et al. | 264/555 |
| 7,641,829 | B2 * | 1/2010 | Liang et al. | 264/157 |
| 8,058,364 | B2 * | 11/2011 | Wang et al. | 525/524 |
| 8,317,978 | B1 * | 11/2012 | Manning et al. | 162/152 |
| 2005/0154116 | A1 | 7/2005 | Nagy et al. | |
| 2005/0239948 | A1 | 10/2005 | Haik et al. | |
| 2006/0017191 | A1 | 1/2006 | Liang et al. | |
| 2006/0166003 | A1 | 7/2006 | Khabashesku et al. | |

(Continued)

FOREIGN PATENT DOCUMENTS

WO  WO 2007050460 A2 *  5/2007

OTHER PUBLICATIONS

T. Kashiwagi, "Flame Retardant Mechanism of the Nanotubes-based Nanocomposites. Final Report" 2007, NIST, pp. 1-65.*

(Continued)

*Primary Examiner* — Jose A Fortuna
(74) *Attorney, Agent, or Firm* — Sutherland Asbill & Brennan LLP (57) ABSTRACT

Flame retardant composite materials are provided which include at least one first paper which comprises carbon nanofibers and graphite oxide particles. The composite materials may further include at least one second paper which comprises carbon nanofibers. The composites may further include one or more structural material layers sandwiched between the first and second papers. Occupant structures are also provided with fire and smoke retardant surfaces composed of carbon nanofibers/graphite oxide particles papers at least partially surrounding occupants of the occupant structures.

15 Claims, 6 Drawing Sheets

(56) References Cited

U.S. PATENT DOCUMENTS

| | | |
|---|---|---|
| 2006/0207931 A1 | 9/2006 | Liang et al. |
| 2006/0293443 A1* | 12/2006 | Reinheimer et al. ......... 524/589 |
| 2007/0176319 A1 | 8/2007 | Thostenson et al. |
| 2008/0057265 A1 | 3/2008 | Liang et al. |
| 2008/0279710 A1* | 11/2008 | Zhamu et al. ..................... 419/6 |
| 2008/0280115 A1 | 11/2008 | Liang et al. |
| 2008/0299419 A1* | 12/2008 | Zhamu et al. .................. 429/12 |
| 2009/0072448 A1* | 3/2009 | Shi et al. ....................... 264/405 |
| 2009/0148637 A1 | 6/2009 | Zhang et al. |
| 2009/0151847 A1* | 6/2009 | Zhamu et al. .................. 156/47 |
| 2009/0280324 A1* | 11/2009 | Liang et al. .................. 428/367 |
| 2009/0281276 A1* | 11/2009 | Wang et al. .................. 528/421 |
| 2010/0021682 A1* | 1/2010 | Liang et al. .................. 428/103 |
| 2010/0021819 A1* | 1/2010 | Zhamu et al. ............. 429/231.8 |
| 2010/0028639 A1* | 2/2010 | Liang et al. .................. 428/220 |
| 2010/0143822 A1* | 6/2010 | Zheng et al. .................. 429/483 |
| 2010/0159127 A1* | 6/2010 | Lin et al. ....................... 427/112 |
| 2011/0045274 A1* | 2/2011 | Bao et al. .................. 428/297.4 |
| 2011/0111279 A1* | 5/2011 | Smithyman et al. .......... 429/122 |
| 2011/0123790 A1* | 5/2011 | Liang et al. .................. 428/220 |
| 2011/0224376 A1* | 9/2011 | Zhai et al. ..................... 525/186 |
| 2011/0253330 A1* | 10/2011 | Zhang et al. .................. 162/124 |
| 2011/0262729 A1* | 10/2011 | Chen et al. .................... 428/221 |
| 2011/0281034 A1* | 11/2011 | Lee et al. ...................... 427/294 |
| 2012/0085970 A1* | 4/2012 | Zhang et al. ............. 252/182.32 |
| 2012/0116094 A1* | 5/2012 | Swager et al. ................ 548/256 |
| 2012/0123061 A1* | 5/2012 | Cheng et al. ............... 525/326.8 |
| 2012/0142832 A1* | 6/2012 | Varma et al. ................. 524/145 |
| 2012/0171093 A1* | 7/2012 | Swager et al. ................ 423/219 |
| 2012/0189877 A1* | 7/2012 | Ferraris et al. .................... 429/9 |
| 2012/0192931 A1* | 8/2012 | Jeon et al. .................... 136/252 |
| 2012/0222812 A1* | 9/2012 | Zeng et al. .................... 156/324 |

OTHER PUBLICATIONS

Higginbotham et al., "Graphite Oxide Flame-Retardant Polymer Nanocomposites," 2009, ACS Applied materials & interfaces, vol. 1, No. 10, pp. 2256-2261.*

Ajayan, et al., "Aligned Carbon Nanotube Arrays Formed by Cutting a Polymer Resin-Nanotube Composite," Science, vol. 265, pp. 1212-1214 (1994).

Ajayan, et all, "Single-Walled Carbon Nanotube-Polymer Composites: Strength and Weakness," Advanced Materials, vol. 12, pp. 750-753 (2000).

Andrews, et al., "Nanotube composite carbon fibers," Applied Physics Letters, 75(9), pp. 1329-1331 (1999).

Chauvet, et al., "Magnetic anisotropies of aligned carbon nanotubes," The American Physical Society, 52(10), pp. 6963-6966 (1995).

Chen, et al., "Electrochemical synthesis of polypyrrole/carbon nanotube nanoscale composites using well-aligned carbon nanotube arrays," Applied Physics A, vol. 73, pp. 129-131 (2001).

Cho, et al., "Carbon nanotube synthesis using a magnetic field via thermal chemical vapor deposition," Journal of Crystal Growth, vol. 243, pp. 224-229 (2002).

Cooper, et al., "Distribution and Alignment of Carbon Nanotubes and Nanofibrils in a Polymer Matrix," Composites Science and Technology, vol. 62, pp. 1105-1112 (2002).

Dai, "Carbon Nanotubes Opportunities and Challenges," Surface Science, vol. 500, pp. 218-241 (2002).

de Heer, et al., "Aligned Carbon Nanotube Films: Production and Optical and Electronic Properties," Science, vol. 268, pp. 845-847 (1995).

Dresselhaus, et al., "Synthesis of Graphite Fibers and Filaments," M. Cardon, Ed., pp. 12-34 (1988).

Endo, et al., "Buckypaper from Coaxial Nanotubes," Nature, vol. 433, p. 476 (2005).

Fan, et al., "Self-Oriented Regular Arrays of Carbon Nanotubes and Their Field Emission Properties," Science, vol. 283, pp. 512-514 (1999).

Fujiwara, et al., "Magnetic Orientation and Magnetic Properties of a Single Carbon Nanotube," The Journal of Physical Chemistry, 105(18), pp. 4383-4386 (2001).

Garg, et al., "Effect of chemical functionalization on the mechanical properties of carbon nanotubes," Chemical Physics Letters, 295(4), pp. 273-278 (1998). Abstract.

Gou, et al., "Experimental Design and Optimization of Dispersion Process for Single-Walled Carbon Nanotube Bucky Paper," International Journal of Nanoscience, 3(3), pp. 293-307 (2004).

Gou, et al., "Development of Nanotube Bucky Paper/Epoxy Nanocomposites," Proceedings of the TEXCOMP-6 International Symposium on textile Composites, Sep. 11-13, 2002.

Gou, et al., "Process Analysis and Optimization of SWNT Bucky Paper Reinforce Epoxy Composites," Proceedings of the 48th International Society for Advancement of Material Process Engineering (SAMPE) Symposium and Exhibition, Long Beach, CA May 12-14, 2003.

Haggenmueller, et al., "Aligned single-wall carbon nanotubes in composites by melt processing methods," Chemical Physics Letters, vol. 330, pp. 219-225 (2000).

Hertel, et al., "Deformation of Carbon Nanotubes by Surface van der Waals Forces," Physical Review B., 58(20), pp. 13870-13873 (1998).

Holloway, et al., "Texture Development Due to Preferential Grain Growth of Ho—Ba—Cu—O in 1.6-T Magnetic Field," J. Mater. Res. 8(4), pp. 727-733 (1993).

Kashiwagi, et al., "Flammability properties of polymer nanocomposites with single-walled carbon nanotubes: effects of nanotube dispersion and concentration," Polymer 46, pp. 471-481 (2005).

Kimura, et al., "Polymer Composites of Carbon Nanotubes Aligned by a Magnetic Field," Advanced Materials, 14(19, pp. 1380-1383 (2002).

Knez, et al., "Electrochemical modification of individual nano-objects," Journal of Electroanalytical Chemistry, vol. 522, pp. 70-74 (2002).

Kumar, et al., "Fibers from Polypropylene/Nano Carbon Fiber Composites," Polymer, vol. 43, pp. 1701-1703 (2002).

Kyotani, et al., "Preparation of Ultrafine Carbon Tubes in Nanochannels of an Anodic Aluminum Oxide Film," Chem. Mater. vol. 8, pp. 2109-2113 (1996).

Li, et al., "Large-Scale Synthesis of Aligned Carbon Nanotubes," Science, 274(5293), pp. 1701-1703 (1996).

Liang, et al., Molecular Dynamic Simulation and Experimental Investigation of Filling Chopped SWNTS with Resin Matrix Molecules to Enhance Interfacial Bonding and Loading Transfer in Nanocomposites, SAMPE 2004, Long Beach, CA , May 16-24, 2004.

Lourie, et al., "Evaluation of Young's modulus of carbon nanotubes by micro-Raman spectroscopy," Journal of Mater. Res., 13(9), pp. 2418-2422 (1998).

Morgan, et al., "Flammability of Polystyrene Layered Silicate (Clay) Nanocomposites: Carbonaceous Char Formation," Fire Mater., vol. 26, pp. 247-253 (2002).

Ni, et al., "Chemical Functionalization of Carbon Nanotubes through Energetic Radical Collisions," Physical Review B., 61(24), pp. R16343-R16346 (2000).

Qian, et al., "Load transfer and deformation mechanism in carbon nanotube-polystyrene composites," Applied Physics Letters, 76(20), pp. 2868-2870 (2000).

Smith, et al., "Structural anisotropy of magnetically aligned single wall carbon nanotube films," Applied Physics Letters, 77(5), pp. 663-665 (2000).

Sorathia, et al., "Fire safety of composites in the US Navy," Composites. Part A, Applied science and manufacturing, 30(5), pp. 707-713 (8 ref.) (1999). Abstract.

Stéphan, et al., "Characterization of singlewalled carbon nanotubes—PMMA composites," Synthetic Metals, 108(2), pp. 139-149 (2000). Abstract.

Thostenson, et al., "Advances in the science and technology of carbon nanotubes and their composites: a review," Composites Sci. and Tech. 61, pp. 1899-1912 (2001).

Thostenson, et al., "Nanocomposites in Context," Composites Science and Technology, vol. 65, pp. 491-516 (2005).

Treacy, et al., "Exceptionally High Young's Modulus Observed for Individual Carbon Nanotubes," Nature, vol. 381, pp. 678-680 (1996).

(56) References Cited

OTHER PUBLICATIONS

Velasco-Santos, et al., "Chemical Functionalization of Carbon Nanotubes through an Organosilane," Nanotechnology, vol. 13, pp. 495-498 (2002).

Wang, et al., "Growth and characterization of buckybundles," Applied Physics Letters, 62(16), pp. 1881-1883 (1993).

Wang, et al., "Fabrication and Characterization of In-Plane Aligned Nanotube Composites with Magnetically Aligned Carbon Nanotube Bucky Papers," Proc. 14th Int. Conf. on Composite Materials (ICCM-14), (San Diego, CA, Jul. 14-18, 2003).

Wood, et al., "Orientation of Carbon Nanotubes in Polymers and its Detection by Raman Spectroscopy," Composites: Part A, vol. 32, pp. 391-399 (2001).

Wu, et al., "Deposition of Nanotube Composites using Matrix-Assisted Pulsed Laser Evaporation," Materials Research Society Symposium, vol. 617, pp. J2.3.1-J2.3.6 (2000).

Wu, et al., "Fire retardancy of a buckypaper membrane," Carbon, vol. 46, pp. 1159-1174 (2008).

* cited by examiner

FIRE AND SMOKE RETARDANT COMPOSITE MATERIALS

CROSS-REFERENCES TO RELATED APPLICATIONS

This application claims priority to U.S. Provisional Application No. 61/325,009, filed Apr. 16, 2010, which is incorporated herein by reference.

TECHNICAL FIELD

The present invention relates generally to the field of polymer composite materials and more particularly to fire and smoke retardant composite materials and structures made therewith.

BACKGROUND

Composite materials, such as those that include fiber and/or organic resin, are characterized by strength, low weight, and weather resistance, making them attractive substitutes for traditional materials in many applications. For example, fiber reinforced polymer (FRP) matrix composites are replacing conventional metallic materials and becoming increasingly popular engineering materials in many sectors of industry, such as aircraft, wind blades, automobiles, naval construction, infrastructures, and offshore structures. However, these composite materials may also display undesirable characteristics upon exposure to open flame or high levels of radiant heat, including surface flammability, smoke generation, and toxic product generation. Because heavy smoke hinders escape efforts and toxic fumes may cause the death of occupants, use of such composites in the construction of buildings, aircraft, watercraft, and vehicles has been limited. Thus, though metal materials are undesirably heavier and corrosive, the flammability of composite materials prevents their substitution in many applications.

Various approaches have been proposed to reduce the flammability of composite materials. One method involves combining flame resistant additives with polymer matrices. In FRP resins, for example, a flame resistant additive may be added to the resin prior to fiber impregnation. However, these additives also display problems such as poor compatibility, leaching, and a reduction in strength and/or other desired mechanical properties of the composite material. For example, traditional halogen-based flame retardant additives are extremely effective at reducing flammability but may release corrosive and toxic chemicals in use.

Another proposed method involves using nanoscale fillers such as $SiO_2$, $Al_2O_3$, $TiO_2$, layered silicates, graphite, or carbon nanotubes to improve the flame retardancy of polymers. When exposed to a flame, a network of carbon nanotubes within a material will act as a barrier for chemical and thermal transport while also providing a protective char on the material surface. The surface char decreases the emission of toxic chemicals and the displacement of oxygen and also provides a thermal barrier that decreases the rate of heat dispersion, thereby minimizing the spread of the flame. Further, such nanofillers may not produce toxic gases. However, strong van der Waals forces between the nanofillers make uniform dispersion of the fillers in a matrix material difficult, and the addition of the fillers significantly increases the viscosity of polymer resin, which may in turn create processibility problems. In fiber-reinforced composites, for example, the flow of resin through the porous fiber mats is difficult and the fiber mats undesirably may filter out the fillers during the manufacturing process. Research has also indicated that nanocomposite material failures are primarily due to poor particle dispersion. Homogenous filler dispersion is thus an obstacle to implementing the use of nanoscale fillers for improving fire retardancy.

U.S. Patent Application Publication No. 2009/0148637 by Zhang, et al. discloses manufacturing composites or nanocomposites with carbon nanotube membranes for flame resistant applications. Specifically, free-standing mats (buckypapers) of entangled carbon nanotubes or nanotube ropes are proposed as flame retardant shields on the surface of composites. When exposed to a flame, a buckypaper will act as an excellent insulator, protecting the underlying polymer composite material. However, the buckypaper fabrication process can be time-consuming and expensive.

It would therefore be desirable to provide improved fire retardant materials and easier, more cost-effective fabrication methods, to reduce or avoid some or all of the foregoing deficiencies and limitations.

SUMMARY

In one aspect, a flame retardant composite material is provided with improved flame-retardant performance. In one embodiment, the flame retardant composite material includes one or more first papers which contain carbon nanofibers (CNF) and graphite oxide (GO) particles. The flame retardant composite material may also include one or more second papers of carbon nanofibers.

In certain embodiments, one or more structural or material layers are disposed between first and second outer layers. The first outer layer includes at least one CNF/GO-containing paper. The second outer layer may include at least one CNF paper and/or at least one CNF/GO paper. The one or more structural layers may comprise a polymer, such as a polymeric matrix material.

In another aspect, a method of making a flame retardant composite material is provided. In one embodiment, the method includes (i) preparing a suspension of carbon nanofibers and graphite oxide particles in a non-solvent, and (ii) filtering the suspension through a membrane to provide a first paper containing the carbon nanofibers with the graphite oxide particles distributed therein. The method may further include preparing a suspension of carbon nanofibers in a non-solvent, filtering the suspension through a membrane to provide a second paper containing the carbon nanofibers, and then combining the first and second papers together with a resin material. For example, the first paper may be placed on the surface of a mold, one or more structural layers may be placed on the first paper, the second paper may be placed on the one or more structural layers, and then a liquid resin may be injected into the mold, thereby producing a molded composite material. The composite material can then be demolded. The resulting composite material, including the first paper, one or more structural layers, and the second paper, may be in a variety of shapes and sizes for making various structures and for use in various fire and smoke retardant applications.

In still another aspect, an apparatus is provided with improved flammability properties. In one embodiment, the apparatus has an exterior portion and an interior portion that defines an occupant space. The apparatus may be formed, at least in part, of a flame retardant composite material including a paper which contains carbon nanofibers and graphite oxide.

In a particular embodiment, the CNF/GO paper is applied on a first surface proximate the occupant space of the apparatus.

DETAILED DESCRIPTION

Improved flame and smoke retardant composite materials have been developed. Flame retardant composite materials are provided which include at least one first paper which comprises carbon nanofibers (CNF) and graphite oxide (GO) particles. In other words, the composite materials include CNF/GO "papers" or "skins" on a surface of or within the composites. These CNF/GO papers are thin, sheet-like structures composed of carbon nanofibers with particles of graphite oxide distributed therein. The composite materials may further include at least one second paper which comprises carbon nanofibers. The composites may further include one or more structural material layers sandwiched between the first and second papers. These composite materials may be fiber reinforced polymer (FRP) matrix composites. Occupant structures are also provided with fire and smoke retardant surfaces composed of the carbon nanofibers/graphite oxide particles papers at least partially surrounding occupants of the occupant structures.

Advantageously, these improved flame retardant materials are relatively cost effective and easy to produce and provide an effective and reliable technical solution for fabricating flame and smoke retardant composites, as it has been demonstrated that incorporation of CNF/GO papers on and in polymeric composites reduces material flammability properties. Furthermore, as compared to carbon nanotubes, CNF have higher thermal stability, which allows CNF to withstand higher temperature and longer exposure to flame. Beneficially, the hydrophilic graphite oxides disperse readily in water, breaking into mostly single-layer macroscopic flakes, which simplifies the fabrication of the CNF/GO papers.

As used herein, the term "flame retardant" refers to the characteristic of reducing at least one flammability property of another material, such as a structural or composite material. As used herein, the term "flammability property" includes the flammability, the smoke generation, the toxic product generation, or combinations of these properties, a material exhibits when exposed to fire or radiant heat. These flammability properties may be or may correlate to measurements of time to ignition, heat release rate (HRR), total heat released, peak heat release rate, maximum average rate of heat emission (MAHRE), fire growth rate (FIGRA), total smoke released, smoke production rate, carbon dioxide yield, and/or mass loss during combustion. MAHRE is defined as the total heat released by a material over a duration of time. An ignition-modified MAHRE parameter may be used to measure a material's fire-spread hazard to nearby objects, with a lower MAHRE value indicating a lower fire-spread hazard. Additionally, FIGRA represents the rate of fire growth for a material once exposed to heat and is determined by dividing the peak HRR by the time to peak HRR. As such, a higher FIGRA may suggest faster flame spread and fire-spread hazard.

Carbon nanofibers may be in the form of a hollow core defined by a catalytic layer of a graphitic tubular core which is surrounded by an overcoat layer (produced by chemical vapor deposition) of carbon. The CNF may have diameters from 50 to 250 nanometers and lengths from 50 to 250 microns. The CNFs are smaller in diameter than conventional milled carbon fibers (5-10 microns) and larger in diameter than carbon nanotubes (1-10 nanometers). CNFs are available commercially, for example, from Pyrograf Products, Inc. (Cedarville, Ohio). In various embodiments, the CNFs of the first and second papers may have diameters between about 100 nm and about 200 nm and lengths of between about 1 μm and about 100 μm.

In one aspect of the present disclosure, a flame retardant composite material is provided with improved flame-retardant performance. The flame retardant composite material includes at least one first paper containing CNF/GO. The CNF/GO papers act as physical protective layers, reducing the spread of fire, toxic gas and smoke generation during combustion, due to their low density, small pore size, low gas permeability, chemical resistance, and high thermal stability. In various embodiments, the flame retardant composite material also includes at least one second paper containing CNF.

In certain embodiments, the CNF/GO paper may have an average thickness in the range of about 5 μm to about 100 μm and a basis weight (e.g., area density) as low as about 0.07 oz./ft$^2$ or 21 g/m$^2$. In some embodiments, the weight ratio of graphite oxide to carbon nanofibers in the at least one first paper is between about 1:1 and about 1:5.

The present application will now be described more fully hereinafter with reference to the accompanying drawings, in which several embodiments of the application are shown. Like numbers refer to like elements throughout the drawings.

Figure 1A:
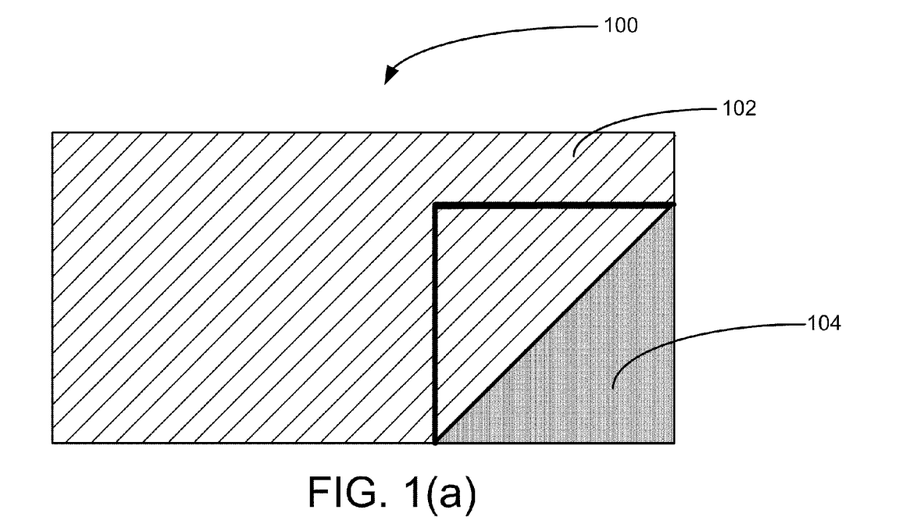
FIGS. 1(a)-(b) are schematic views of flame retardant composite materials in accordance with embodiments of the present invention.

In one embodiment, a flame retardant composite includes a multilayer CNF/GO and CNF structure, as shown in FIG. 1(a). The flame retardant composite material 100 includes a first paper 102 consisting of CNF/GO and a second paper 104 consisting of CNF and at least one flame retardant chemical.

Flame retardant chemicals are known in the art. They may be mineral or synthetic in nature. Representative examples of common flame retardants include minerals such as asbestos, compounds such as aluminum hydroxide, magnesium hydroxide, hydromagnesite, antimony trioxide, various hydrates, red phosphorus, and boron compounds such as borates. Examples of synthetic flame retardant materials, usually halocarbons, include organochlorines such as polychlorinated biphenyls (PCBs), chlorendic acid derivatives (e.g., dibutyl chlorendate or dimethyl chlorendate), and chlorinated paraffins; organobromides such as polybrominated diphenyl ethers (PBDEs) (e.g., pentabromodiphenyl ether (pentaBDE), octabromodiphenyl ether (octaBDE), decabromodiphenyl ether (decaBDE), or hexabromocyclodecane (HBCD)); and organophosphates in the form of halogenated phosphorus compounds such as tri-o-cresyl phosphate, tris(2,3-dibromopropyl) phosphate (TRIS), bis(2,3-dibromopropyl) phosphate, tris(1-aziridinyl-phosphine oxide (TEPA). Additionally, intumescent flame retardants such as ammonium polyphosphate-based flame retardants or Exolit® grade flame retardants by Clariant may be used.

The CNFs of the first and second papers may also be chemically modified or coated with other materials to provide additional functions for the first and second papers made thereof. For example, the CNFs may be coated with metallic materials to enhance the electrical conductivity of the first and second papers made thereof.

In certain embodiments, at least one CNF/GO paper is combined with one or more material or structural layers to form a flame retardant composite material. The material or structural layer(s) may provide mechanical strength and/or additional fire retardant properties. For example, the flame retardant composite material may include fibrous materials dispersed into, woven into, or saturated by another material, such as a plastic, polymer (e.g., ethylene-vinyl acetate copolymer), or resin (e.g., diglycidyl ether of bisphenol F, modified bismaleimide resin (BMI), or polyhedral oliomeric silsequioxane (POSS) resin).

Figure 1B:
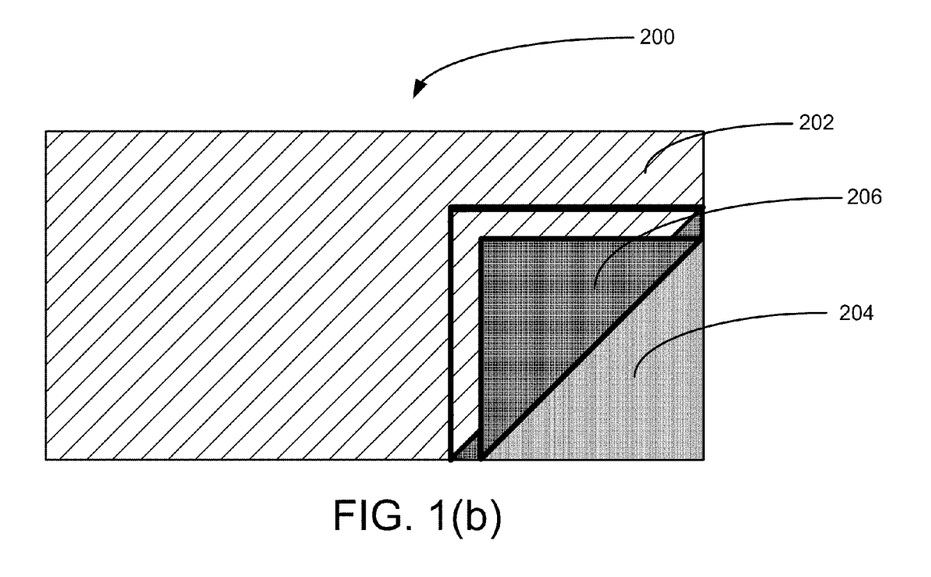

In one embodiment, as shown in FIG. 1(b), a flame retardant composite material 200 includes a first outer layer 202 consisting of at least one CNF/GO paper, a second outer layer 204 consisting of at least one CNF paper, and a structural (material) layer 206 including glass or carbon fibers disposed between the first and second outer layers. The structural layer may in addition or in the alternative include other materials, such as a resin or other polymeric matrix material.

A flame retardant composite material may also include a layer of carbon fibers, glass fibers, fiberglass, aramid fibers, natural fibers, ultra high molecular weight polyethylene, or combinations thereof, dispersed in a polymeric material. In some embodiments, a flame retardant composite material additionally includes adhesives, metals, or any other appropriate materials to make the composite suitable for its intended use. In one embodiment, a composite material with improved flame retardancy (e.g., lower peak HRR) includes clay and MWNTs in ethylene-vinyl acetate copolymer (EVA). Without being bound by a particular theory, the additives are believed to play an active role in the formation of char and the MWNTs may add strength and offer resistance to mechanical cracks due to their long aspect ratio.

In another aspect, methods of making flame retardant composite materials are provided. In one embodiment, the method includes: (i) preparing a suspension of carbon nanofibers and graphite oxide particles in a non-solvent, and (ii) filtering the suspension through a membrane to provide a first paper containing the carbon nanofibers with the graphite oxide particles distributed therein. In some embodiments, the retained solids are dried after being filtered.

For example, a suspension of CNF and graphite flakes dispersed in a non-solvent may be filtered through a membrane such as a nylon membrane. Suitable filtration membranes may include those commonly used in the pharmaceutical industry. Sonication may be used to facilitate the dispersion process.

The CNF may have diameters between 100 nm and 200 nm and lengths between 1 μm and 100 μm. The GO may be obtained by treating graphite flakes with Hummer's method, or by other methods known in the art. The GO layers may be about 1 nm thick. In certain embodiments, the weight ratio of GO to CNF in the suspension is between 1:1 and 1:5. In one embodiment, the CNF/GO mixture is dispersed in a volatile organic liquid, such as isopropyl alcohol, at the weight percentage of about 0.1%.

Figure 2:
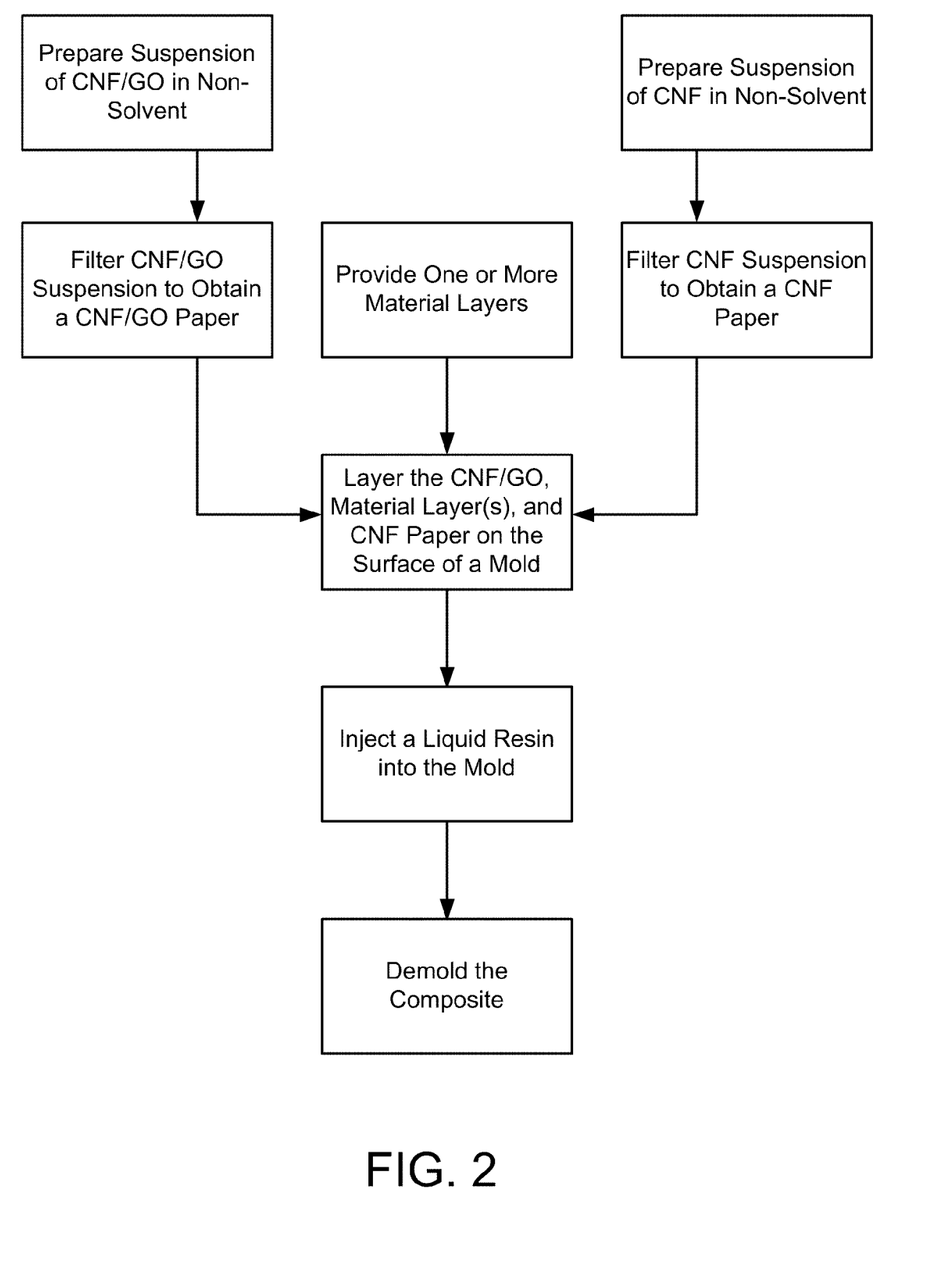
FIG. 2 is a process flow diagram of a method of making a flame retardant composite material in accordance with one or more embodiments of the present invention.

In one embodiment, as shown in the flowchart of FIG. 2, the method further includes: (iii) preparing a suspension of carbon nanofibers in a non-solvent, (iv) filtering the suspension through a membrane to provide a second paper containing the carbon nanofibers, (v) placing the first paper on the surface of a mold or tooling, (vi) placing one or more material layers on the first paper, (vii) placing the second paper on the one or more material layers, (viii) injecting a liquid resin into the mold, and (ix) demolding the composite including the first paper, one or more material layers, and the second paper.

In certain embodiments, a liquid resin such as an epoxy or other polymer precursor is injected into a mold in which first and second papers are applied onto the surface of a material layer. For example, the first and second papers may be applied to a material layer by vacuum assisted resin transfer molding (VARTM), resin transfer molding (RTM), prepreg/autoclave, or hand layup methods. In certain embodiments, first and second papers are placed adjacent to each side of a material layer in a mold and a resin is distributed through the layers using VARTM to form a flame retardant composite. In other embodiments, the resin injection step consists of resin application via a hand layup process in which a resin is applied to individual papers and material layers using spray or brushes and the resulting layers are stacked to form a composite laminate. Alternatively, a spray process may be used to disperse thin layers of nano-additives onto a surface of a woven fabric structure (e.g., a prepreg composite material or a layup composite material) or composite material. For example, carbon or glass weaves may be coated with GO and CNF using a mist spray gun or other apparatus or methods known in the art.

In certain embodiments, the first and/or second papers are made to have a homogenous composition in the thickness direction, e.g., the CNFs are aligned. Alternatively, the first and/or second papers may be made to have a heterogeneous composition in the thickness direction, e.g., the CNFs may be randomly dispersed or the paper may have a gradient of one or more components. In certain embodiments, this is achieved by fabricating and then stacking multiple discrete layers or by the sequential filtration of suspensions of different material compositions. In one embodiment, the composite fabrication method further includes aligning the nanotubes in the nano scale film. For example, this may be done using in situ filtration of the suspensions in high strength magnetic fields, as described for example in U.S. Pat. No. 7,803,262 to Haik et al. or by mechanical stretching of the fabricated papers.

In yet another aspect of the present disclosure, apparatuses including fire retardant composites containing CNF and CNF/GO papers are provided.

Figure 3:
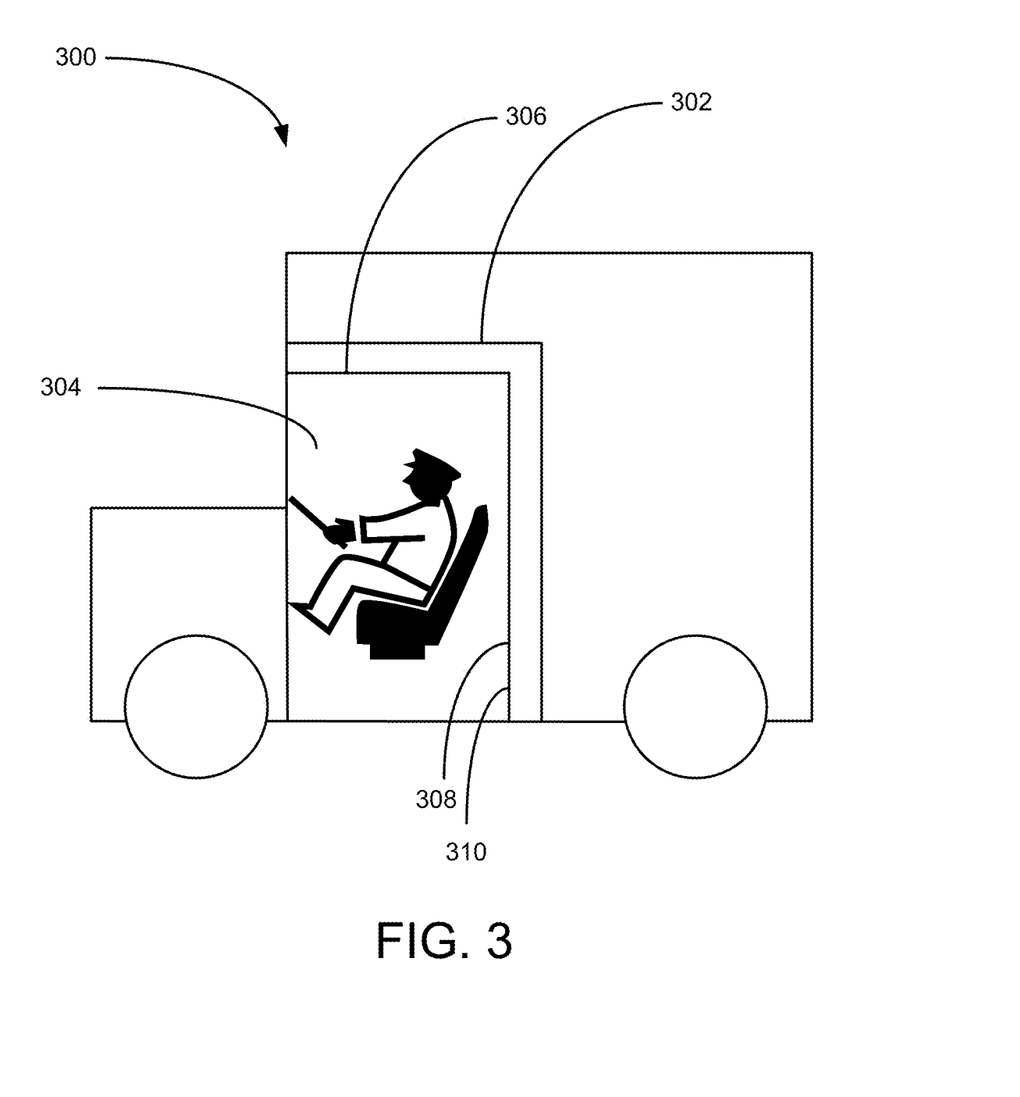
FIG. 3 is a cross-sectional view of an apparatus including a flame retardant composite material in accordance with one or more embodiments of the present invention.

As used herein, the term "apparatus" refers to a building, frame, compartment, wall, craft, vehicle, or the like, or a portion thereof which includes an "occupant structure," such as walls, a cockpit, or passenger compartment, that defines an "occupant space," such as a room, area, or chamber, adapted for entry, vehicle operation, and/or habitation by a human or other animal. In one embodiment, as shown in FIG. 3, the presently disclosed fire retardant composite 310 having at least one CNF/GO paper 308 substantially covers a substantial amount of the interior portion 306 of the occupant space 304 that is within the occupant structure 302 of apparatus 300. For example, the flame retardant composite material may cover more than 50%, such as between 80% and 100%, of the walls bounding or defining the occupant space.

In certain embodiments, a first CNF/GO paper and a second CNF paper are be applied to a composite material which is a part for a craft or vehicle such as an aircraft, land-based vehicle, or marine vessel, such as a warship or submarine.

The materials, composites, and methods described above will be further understood with reference to the following non-limiting examples.

Example 1

CNF and CNF/GO Paper Fabrication

Figure 4A:
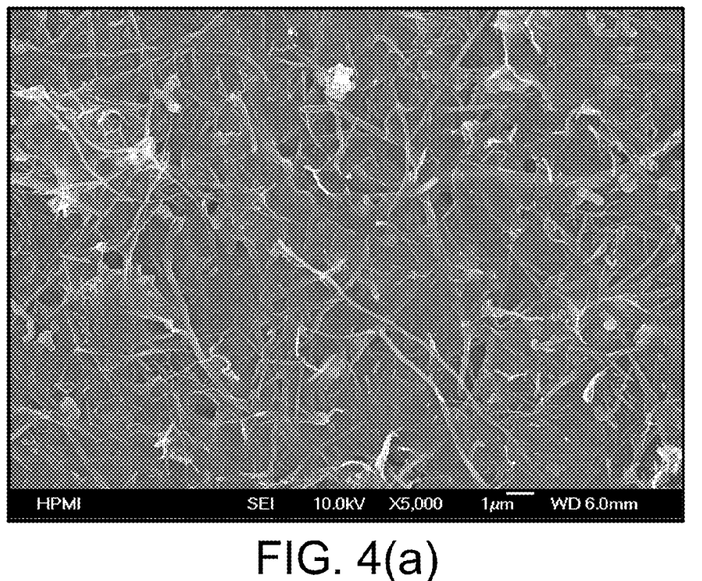
FIGS. 4(a)-(b) are SEM images of CNF/GO and CNF papers.
Figure 4B:
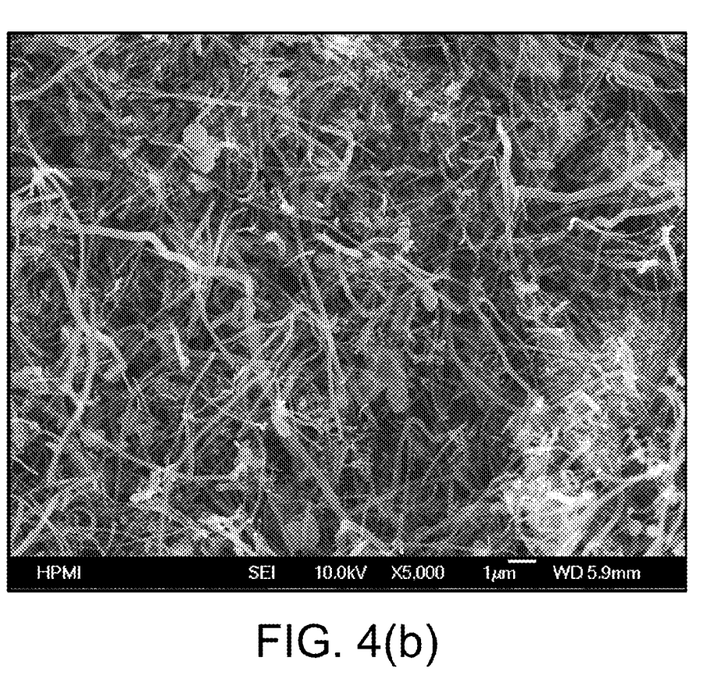

A carbon nanofiber/graphite oxide (CNF/GO) composite paper was produced using carbon nanofibers (P-24) purchased from Pyrograf Products, Inc. and graphite oxide particles obtained by treating graphite flakes with Hummer's method. The carbon nanofibers had a diameter of between 100 nm and 200 nm and a length of between 1 μm and 100 μm. A CNF/GO mixture having a weight ratio between 1:1 and 5:1 was dispersed via sonication in isopropyl alcohol at a weight percentage of 0.1%. The resulting suspension was filtered through a nylon membrane under vacuum and dried to form a free-standing CNF/GO sheet. A CNF paper was produced by a similar process. SEM images of the resulting CNF/GO and CNF papers are shown in FIGS. 4(a) and (b), respectively. Multilayer CNF/GO papers were also produced by two-step and multiple-step filtration of the CNF/GO and CNF suspensions.

Figure 5A:
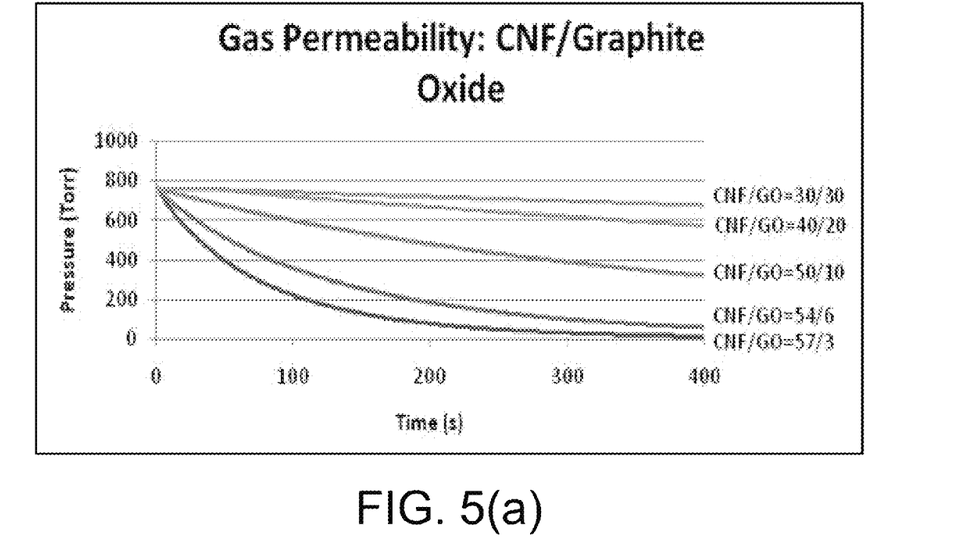
FIGS. 5(a)-(b) are graphs displaying the gas permeability and thermal stability of various CNF/GO papers.
Figure 5B:
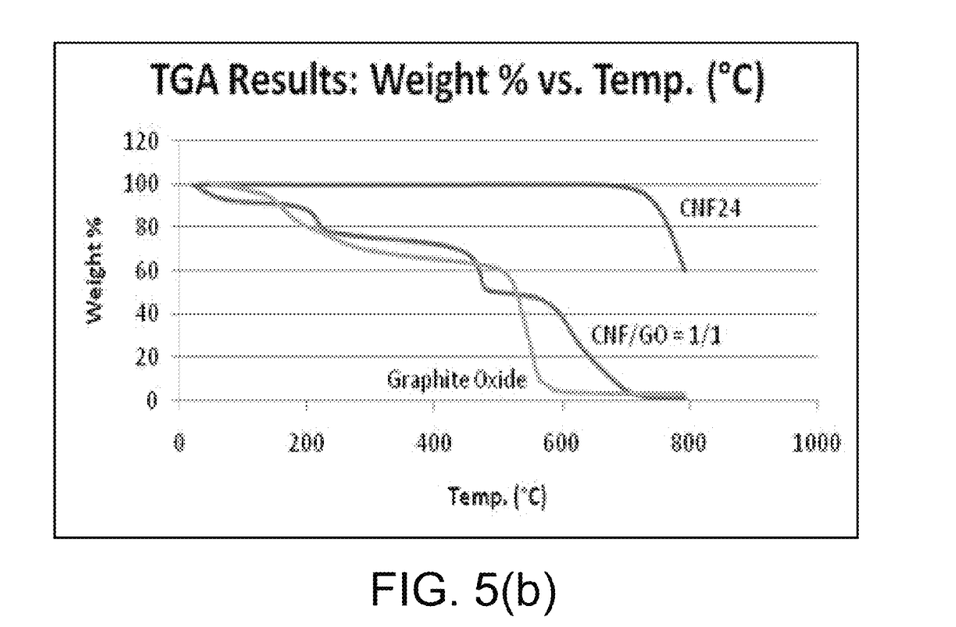

Papers comprising various CNF/GO ratios were tested for gas permeability and thermal stability. The results of these tests are shown in FIGS. 5(a) and (b), respectively. The gas permeability of the CNF/GO paper was characterized by measuring the time dependence of the air pressure drop across the paper when exposed to a dynamic vacuum. Thermogravimetric analysis (TGA) was performed on a TA Instrument Q50 thermal analyzer at atmospheric pressure over a temperature range of 50° C. to 800° C. with a heating rate of 10° C./min and a gas flow rate of 60 ml/min. Overall, these tests show that the pore structure and permeability of CNF/GO papers is variable with paper composition and may be optimized to achieve high resin infusion permeability as well as low gas permeability and high thermal stability for fire retardancy.

Example 2

CNF/GO Composite Fabrication

Flame retardant composites having both CNF/GO and CNF paper skins were fabricated. An IM7 carbon fiber/Epon 862 epoxy composite with CNF/GO and CNF papers was produced with a combination of hand layup and vacuum assisted resin transfer molding (VARTM) processes. IM7 carbon fiber fabrics (style 4178, 5HS weave, 400 g/m2, Textile Products, Inc.) were used in the composite. The epoxy resin impregnated papers and IM7 carbon fabrics were stacked to form a composite laminate. A CNF paper was applied to one side of the carbon fabrics and a CNF/GO paper was applied to the opposite side to act as the main fire shield. Due to its large pore size, the CNF paper did not obstruct resin infusion significantly. The composite laminates were cured at 121° C. for 2 hours and at 177° C. for an additional 2 hours, then cooled to ambient temperature.

Figure 6A:
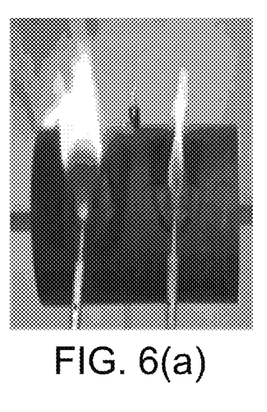
FIGS. 6(a)-(c) are photographic images of a flame torch test being performed on two composite materials.
Figure 6B:
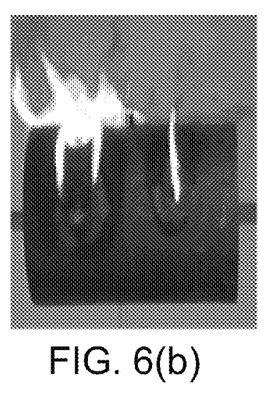
Figure 6C:
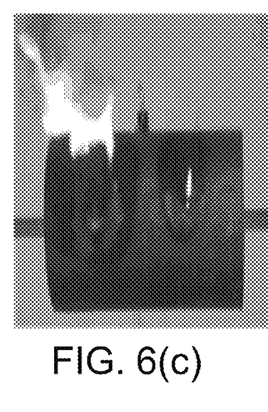

These composites were tested under torch fire. FIGS. 6(a)-(c) show comparative images of the burning process of a composite panel with both a CNF/GO paper skin (shown at right in each image) and without a CNF/GO paper skin (shown at left in each image). FIG. 6(a) shows the two composites after the torch flame was applied for five seconds, FIG. 6(b) shows the two composites at the time the torch flame was removed, and FIG. 6(c) shows the two composites seven seconds after the flame was removed. These images indicate that CNF/GO papers significantly improve the flame and smoke-retardant properties of composite laminates.

Publications cited herein and the materials for which they are cited are specifically incorporated by reference. Modifications and variations of the materials and methods described herein will be obvious to those skilled in the art from the foregoing detailed description. Such modifications and variations are intended to come within the scope of the appended claims.

We claim:

1. A flame retardant composite material comprising:
   at least one first paper which consists of carbon nanofibers and graphite oxide; and
   a structural layer onto which the at least one first paper is affixed as an outer surface skin.

2. The flame retardant composite material of claim 1, wherein the weight ratio of graphite oxide to carbon nanofibers is between about 1:1 and about 1:5.

3. The flame retardant composite material of claim 1, wherein the at least one first paper has an average thickness of between about 5 microns and about 100 microns and a basis weight of at least 21 g/m².

4. The flame retardant composite material of claim 1, wherein the carbon nanofibers have diameters between about 100 nanometers and about 200 nanometers.

5. The flame retardant composite material of claim 1, wherein the carbon nanofibers have lengths of between about 50 microns and about 200 microns.

6. The flame retardant composite material of claim 1, further comprising a second paper which comprises carbon nanofibers.

7. The flame retardant composite material of claim 6, wherein the at least one first paper is a first outer layer of the composite material, the second paper is a second outer layer of the composite material, and the structural layer is disposed between the first and second outer layers.

8. The flame retardant composite material of claim 6, wherein the second paper further comprises at least one flame retardant chemical.

9. The flame retardant composite material of claim 1, wherein the structural layer comprises carbon or glass fibers.

10. The flame retardant composite material of claim 1, wherein the structural layer comprises a fiber reinforced polymer matrix.

11. A flame retardant composite material comprising:
    a first paper which consists of carbon nanofibers and graphite oxide;
    a structural layer which comprises a polymeric material; and
    a second paper which comprises carbon nanofibers;
    wherein the first paper is a first outer layer of the composite material, the second paper is a second outer layer of the composite material, and the structural layer is disposed between the first and second outer layers.

12. A flame retardant composite material comprising:
    a paper which consists of carbon nanofibers and graphite oxide, wherein the weight ratio of graphite oxide to carbon nanofibers in the paper is from 1:1 to 1:5.

13. The composite material of claim 12, further comprising a structural layer onto which the paper is affixed as an outer surface skin.

14. The composite material of claim 12, wherein the paper has an average thickness from 5 microns to 1.00 microns and a basis weight of at least 21 g/m².

15. The composite material of claim 14, further comprising a structural layer onto which the paper is affixed as an outer surface skin.

* * * * *

UNITED STATES PATENT AND TRADEMARK OFFICE
CERTIFICATE OF CORRECTION

PATENT NO. : 8,585,864 B2
APPLICATION NO. : 13/089013
DATED : November 19, 2013
INVENTOR(S) : Chuck Zhang et al.

It is certified that error appears in the above-identified patent and that said Letters Patent is hereby corrected as shown below:

In the Claims:

At column 8, line 61, in claim 14, after "5 microns to" delete "1.00" and insert --100--.

Signed and Sealed this
Twenty-first Day of January, 2014

Michelle K. Lee
*Deputy Director of the United States Patent and Trademark Office*